US010246333B1

(12) United States Patent
Kim et al.

(10) Patent No.: US 10,246,333 B1
(45) Date of Patent: Apr. 2, 2019

(54) METHOD FOR CONTINUOUS MANUFACTURE OF CNTF HAVING HIGH STRENGTH AND HIGH CONDUCTIVITY

(71) Applicant: KOREA INSTITUTE OF SCIENCE AND TECHNOLOGY, Seoul (KR)

(72) Inventors: Seung Min Kim, Hoengseong-gun (KR); Hyeon Su Jeong, Hoengseong-gun (KR); Jae Geun Lee, Hoengseong-gun (KR); Dong Myeong Lee, Hoengseong-gun (KR); Hun Su Lee, Hoengseong-gun (KR); Young Kwan Kim, Hoengseong-gun (KR); Jun Beom Park, Hoengseong-gun (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/005,065

(22) Filed: Jun. 11, 2018

(30) Foreign Application Priority Data

Dec. 11, 2017 (KR) .................. 10-2017-0169644

(51) Int. Cl.
*D01F 9/12* (2006.01)
*C01B 32/17* (2017.01)
*C08K 3/04* (2006.01)
*C01B 32/162* (2017.01)
*B82Y 40/00* (2011.01)
*B82Y 30/00* (2011.01)

(52) U.S. Cl.
CPC .............. *C01B 32/17* (2017.08); *C08K 3/041* (2017.05); *B82Y 30/00* (2013.01); *B82Y 40/00* (2013.01); *C01B 32/162* (2017.08); *C01B 2202/34* (2013.01)

(58) Field of Classification Search
CPC .... C01B 32/17; C01B 32/162; C01B 2202/34; C08K 3/041; B82Y 30/00; B82Y 40/00
See application file for complete search history.

(56) References Cited

U.S. PATENT DOCUMENTS

| | | | | |
|---|---|---|---|---|
| 2005/0006801 | A1* | 1/2005 | Kinloch | ................ B82Y 30/00 264/5 |
| 2006/0188718 | A1 | 8/2006 | Nitta et al. | |
| 2007/0116629 | A1 | 5/2007 | Harutyunyan et al. | |
| 2009/0186223 | A1* | 7/2009 | Saito | ...................... D01F 9/127 428/367 |
| 2016/0222536 | A1* | 8/2016 | Schauer | ................... C25F 1/00 |

FOREIGN PATENT DOCUMENTS

| | | |
|---|---|---|
| JP | 4209845 B2 | 1/2009 |
| JP | 2009-508797 A | 4/2017 |
| KR | 10-1718784 B1 | 3/2017 |
| KR | 10-17268223 B1 | 4/2017 |

OTHER PUBLICATIONS

Datsyuk, et al., Chemical oxidation of multiwalled carbon nanotubes, Carbon 2008; 46: 833-840 (Year: 2008).*
Office Action dated Nov. 7, 2018, in Korean Patent Application No. 10-2017-0169644.

* cited by examiner

*Primary Examiner* — Daniel McCracken
(74) *Attorney, Agent, or Firm* — Birch, Stewart, Kolasch & Birch, LLP

(57) ABSTRACT

Provided is a method for continuously manufacturing carbon nanotube fibers with high strength and high conductivity, which includes synthesizing carbon nanotube fibers by direct spinning; treating the carbon nanotube fibers with a strong acid while applying tension thereto; and washing the carbon nanotube fibers treated with the strong acid.

7 Claims, 17 Drawing Sheets

METHOD FOR CONTINUOUS MANUFACTURE OF CNTF HAVING HIGH STRENGTH AND HIGH CONDUCTIVITY

CROSS-REFERENCE TO RELATED APPLICATIONS

This application claims priority to Korean Patent Application No. 10-2017-0169644 filed on Dec. 11, 2017, the entire contents of which are hereby incorporated by reference in their entirety.

BACKGROUND OF THE INVENTION

Field of the Invention

The present invention relates to a method for continuously manufacturing carbon nanotube fibers with high strength and high conductivity

Related Art

Carbon nanotubes, an allotrope of carbon, have a structure that graphenes are cylindrically wrapped up, and have a diameter of several nanometers. Due to the excellent mechanical and physical properties, carbon nanotubes have been actively studied in academic fields. Carbon nanotubes have a tensile strength of a few tens of GPa, an electrical conductivity of 1 MS/cm, and a thermal conductivity of 6,600 W/mK.

However, carbon nanotubes have a short length and thus it is difficult to exhibit performances when applied to a composite material, and also had limitations in their applications because they are difficult to handle directly and are also hardly dispersed. Since the 2000s, the technology of manufacturing carbon nanotubes in the form of long fibers has been developed, thereby suggesting various applications of carbon nanotubes. Carbon nanotube fibers are spun yarns where carbon nanotubes are physically weaved to establish a fiber form.

Among the methods for manufacturing carbon nanotube fibers, there are two major methods suitable for their mass production. The first method is a continuous gas phase spinning method. This method, which was first published by Cambridge University in 2004, is a spinning method where nanotubes are synthesized in the gas phase in the form of a fiber to be manufactured as in the case of cotton candy production. This is a continuous process and it has an advantage in that the process is simple because carbon nanotubes become fibrous simultaneously as they are synthesized. Additionally, this process has an advantage in that the process does not require a separate process of dissolving the carbon nanotubes thus making it possible to manufacture carbon nanotube fibers comprised of long carbon nanotubes. However, there is a limitation in that these carbon nanotubes have a low density and orientation degree.

The second method to manufacture carbon nanotube fibers is a wet spinning method in which a dope is manufactured by dispersing carbon nanotubes in a solvent. Generally, carbon nanotubes are insoluble in most solvents and also are not easy to disperse. Rice University has revealed that chlorosulfonic acid (CSA) can thermodynamically dissolve carbon nanotubes and liquid crystal phase of carbon nanotubes can be realized. Rice University has manufactured fibers with high orientation and density using the above discovery. The drawback of this technique is that it is difficult to manufacture carbon nanotube fibers comprised of long carbon nanotubes because it is difficult to dissolve long carbon nanotubes. Due to the above problems, there is a need for the development of a method for continuously manufacturing carbon nanotube fibers consisting of long CNTs with highly aligned and densified structures in fast and scalable way, thus producing CNT fibers with high tensile strength and electrical conductivity.

SUMMARY OF THE INVENTION

An object of the present invention is to provide a method for continuously manufacturing carbon nanotube fibers with high strength and high conductivity.

The object of the present invention relates to a method for continuously manufacturing carbon nanotube fibers with high strength and high conductivity and is achieved by a method which includes synthesizing carbon nanotube fibers by direct spinning; treating the carbon nanotube fibers with a strong acid while applying tension thereto; and washing the carbon nanotube fibers treated with the strong acid.

The carbon nanotube fibers after the washing may have a density of 1.1 g/cm$^3$ or greater, a specific strength of 2 N/tex or greater, and an electrical conductivity of 2 MS/m or greater.

The carbon nanotube fibers may have an $I_G/I_D$ ratio of 10 or greater.

The tension may be applied so as to stretch the carbon nanotube fibers by 4% to 15%.

The tension may be applied so as to stretch the carbon nanotube fibers by 8% to 15%.

The method may further include oxidizing the carbon nanotube fibers before treating with the strong acid.

The oxidation may be performed so that the oxygen atoms are comprised in the carbon nanotube fibers in the range of 2% to 20%.

The method may further include coagulating the carbon nanotube fibers after the treatment with the strong acid.

The strong acid may include at least one selected from the group consisting of sulfuric acid, chlorosulfonic acid, fuming sulfuric acid, fluorosulfonic acid ($FSO_3H$), trifluoroacetic acid ($CF_3COOH$), trifluoromethanesulfonic acid ($CF_3SO_3H$), fluoroantimonic acid ($HSbF_6$), and carborane acid.

DESCRIPTION OF EXEMPLARY EMBODIMENTS

In the present invention, carbon nanotube fibers are oxidized by heat treatment and/or plasma treatment. Then, using a strong acid, the degree of alignment of carbon nanotube fibers is increased, the carbon nanotube fiber is densified, and metal catalyst impurities are removed. The carbon nanotube fibers may be manufactured by a continuous gas phase synthesis method.

Once the carbon nanotubes are in the form of fibers, the movement of the carbon nanotubes is greatly restricted. Accordingly, it is difficult to densify the carbon nanotube fibers so as to effectively eliminate randomly distributed voids inside the fibers. In the present invention, the carbon nanotube fibers are passed through a strong acid, such as chlorosulfonic acid, to provide them with solubility. When the carbon nanotube fibers are immersed in chlorosulfonic acid, chlorosulfonic acid penetrates into the carbon nanotube fibers, thus making the fiber swell by driving electrostatic repulsion between carbon nanotubes based on protonation, and the carbon nanotubes are provided with fluidity. In this process, the metal catalyst particles contained in the fibers are dissolved in chlorosulfonic acid and thereby removed as well.

In the present invention, a tension is applied to carbon nanotube fibers in this state and thereby stretch the fibers. Then, the fibers are coagulated in a solvent such as acetone and washed using various solvents and thereby chlorosulfonic acid is removed. Then, the fibers are dried in a vacuum oven or furnace to remove chlorosulfonic acid and/or a coagulant completely.

When a tension is applied while carbon nanotube fibers treated with chlorosulfonic acid, the degree of alignment of carbon nanotubes increases, and when this is coagulated in a solvent such as acetone, the fiber is densified.

As the distance between the carbon nanotubes becomes closer and the contact area between carbon nanotubes is naturally increased, the attraction forces such as Van der Waals forces increases thereby increasing mechanical strength and Young's modulus, and the electrical conductivity and thermal conductivity also increase.

According to the present invention, carbon nanotube fibers also undergo a change in shape. The carbon nanotube fibers obtained by direct spinning of gas phase aerogel often have an irregular shape of cross-sections even when the linear density is uniform. According to the present invention, when carbon nanotube fibers are coagulated after chlorosulfonic acid treatment, a symmetrical realignment occurs thereby converting the fibers into those having a shape close to a cylindrical shape based on the fiber axis. The cross-sections of the fibers become closer to a circle shape having a uniform diameter.

Hereinafter, the present invention will be described in detail with reference to FIG. 1 and FIG. 2.

Figure 1:
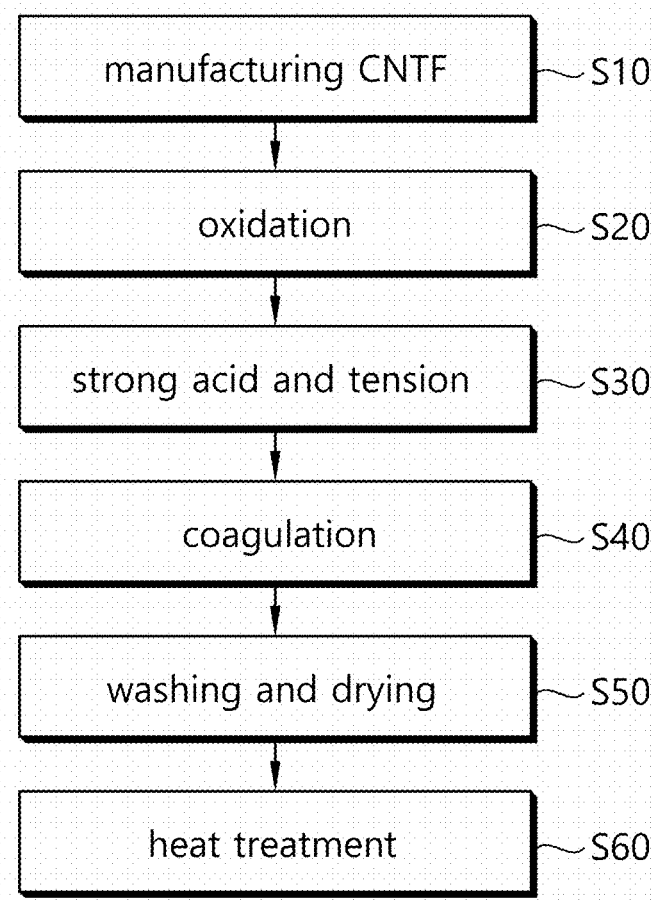
FIG. 1 shows a flow chart of a method for manufacturing carbon nanotube fibers according to an embodiment of the present invention.
Figure 2:
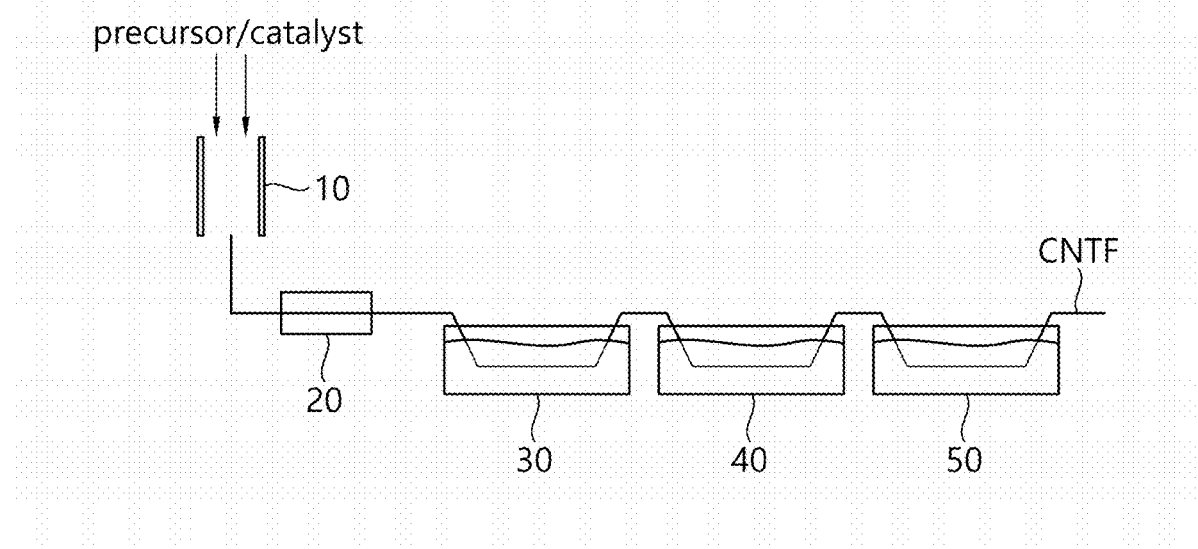
FIG. 2 shows a schematic view of an apparatus for manufacturing carbon nanotube fibers according to an embodiment of the present invention.
Figure 3A:
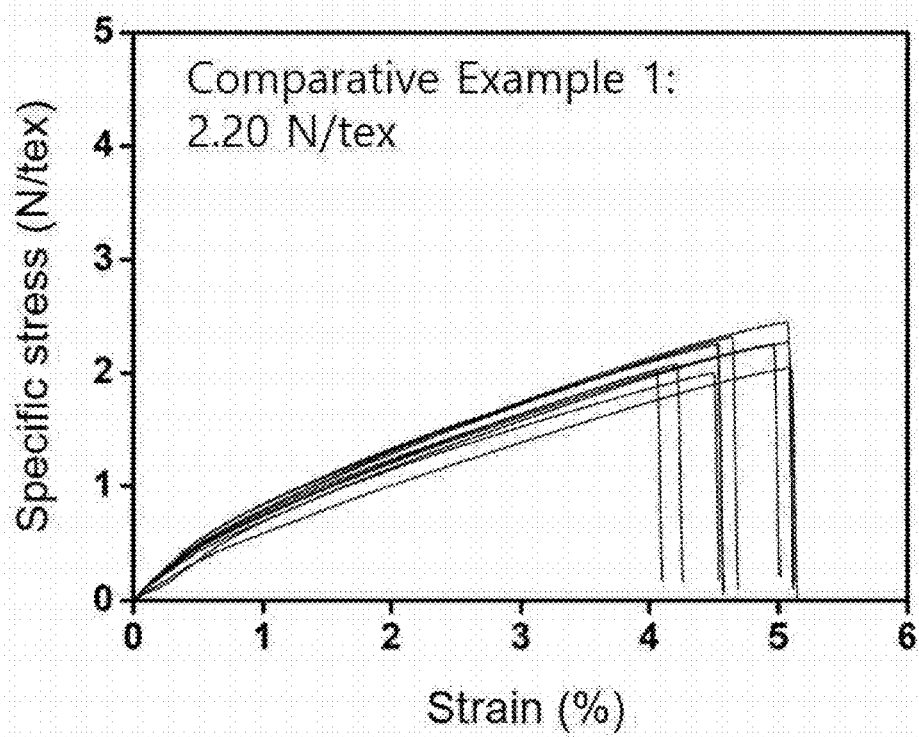
FIG. 3A to FIG. 3K show the test results of tensile strength of the carbon nanotube fibers manufactured in Experimental Example.
Figure 3B:
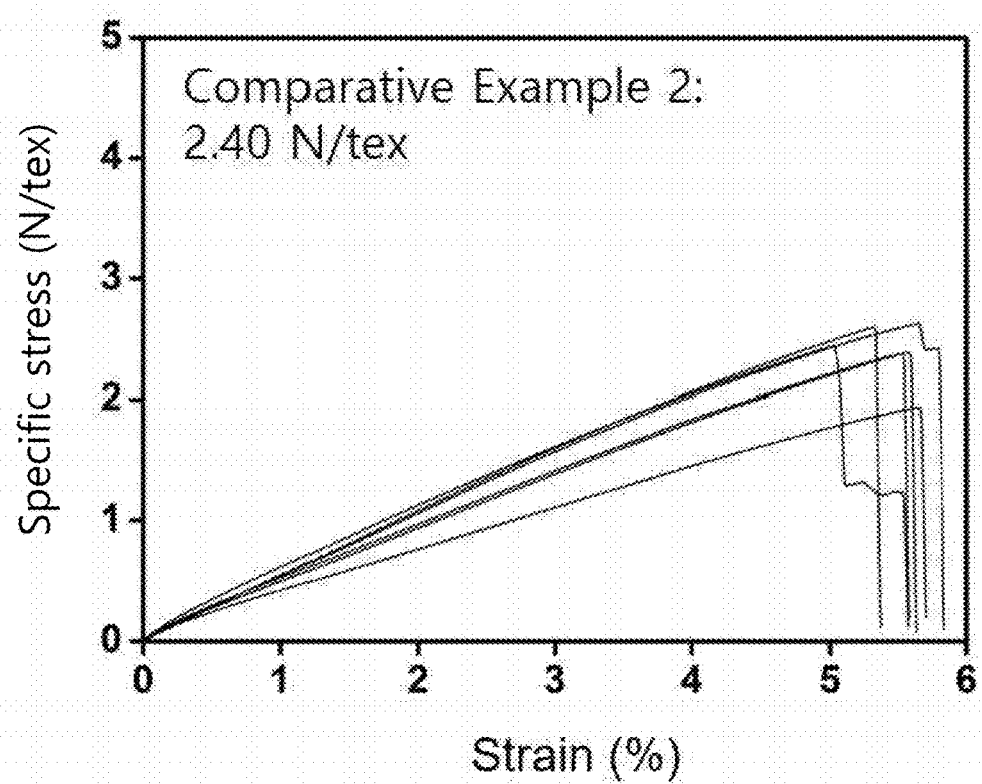
Figure 3C:
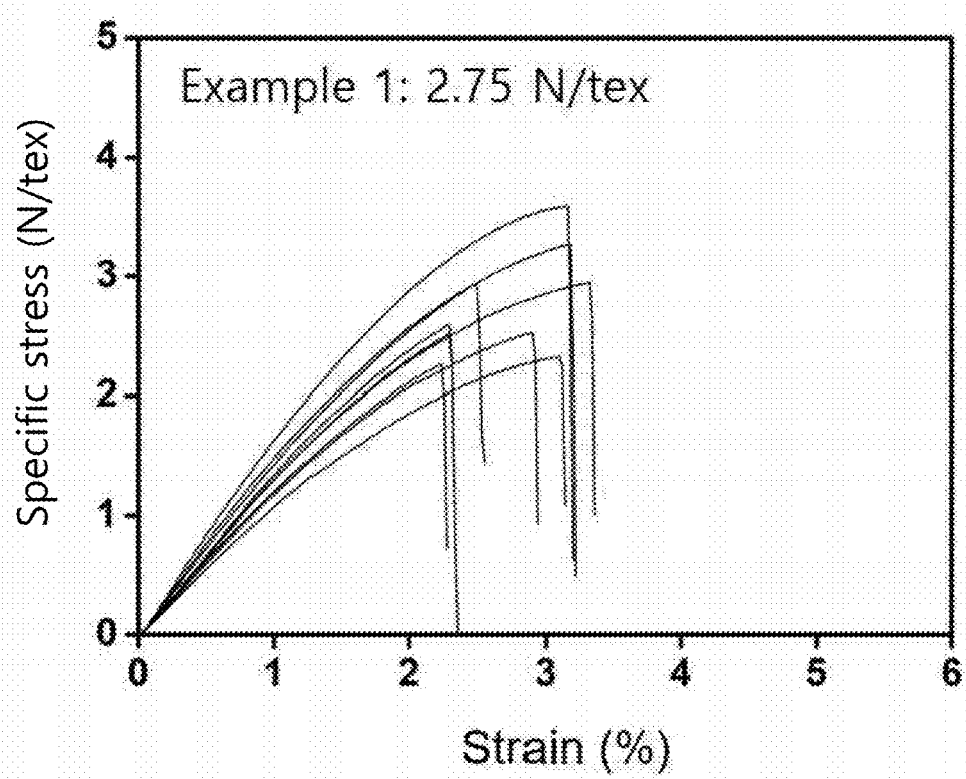
Figure 3D:
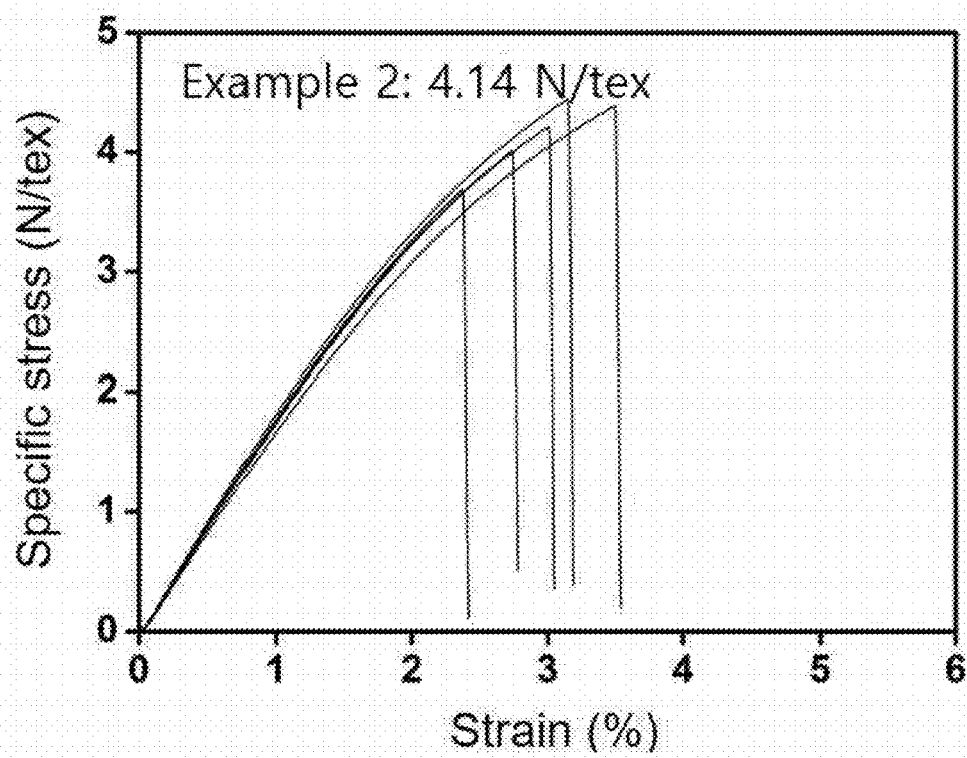
Figure 3E:
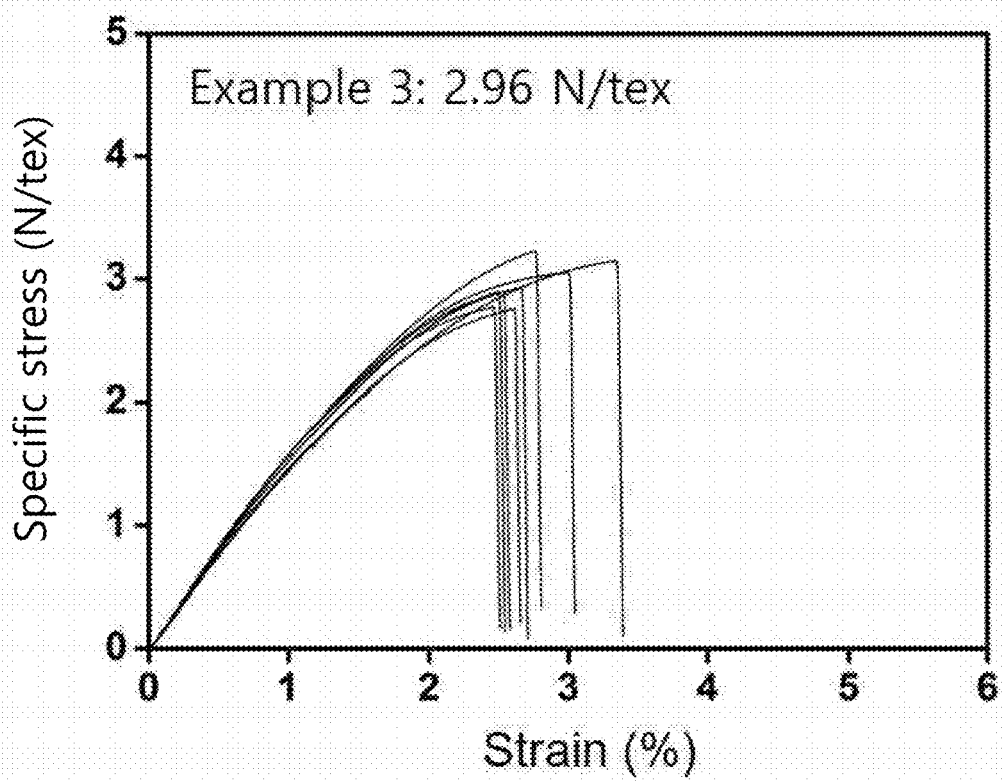
Figure 3F:
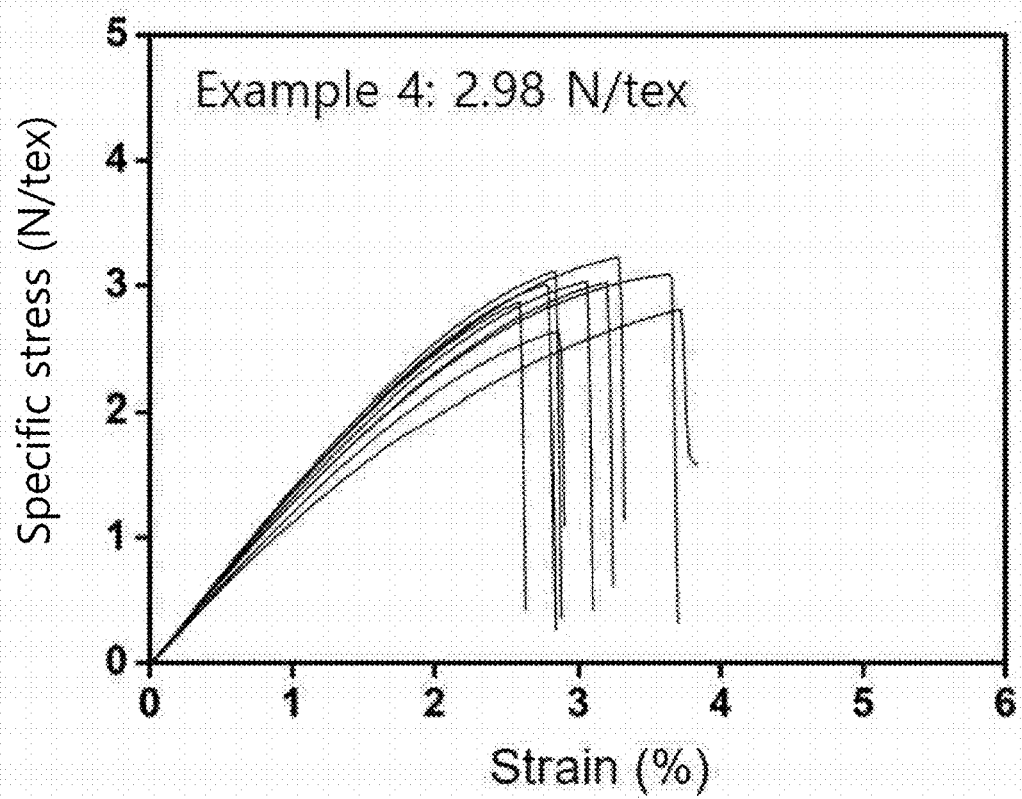
Figure 3G:
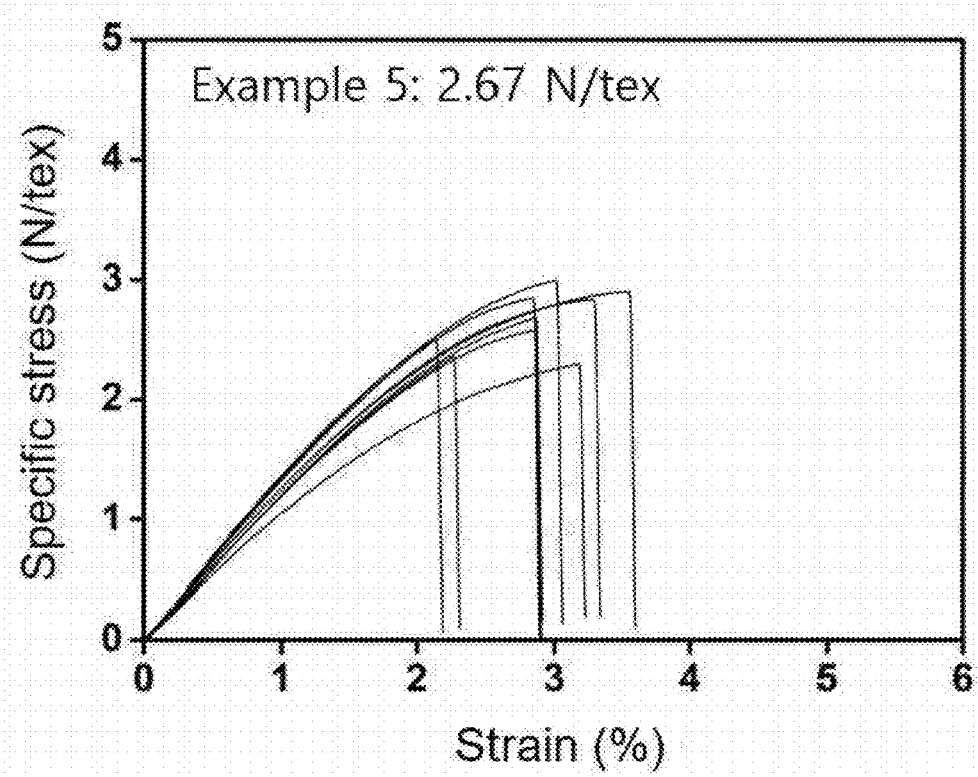
Figure 3H:
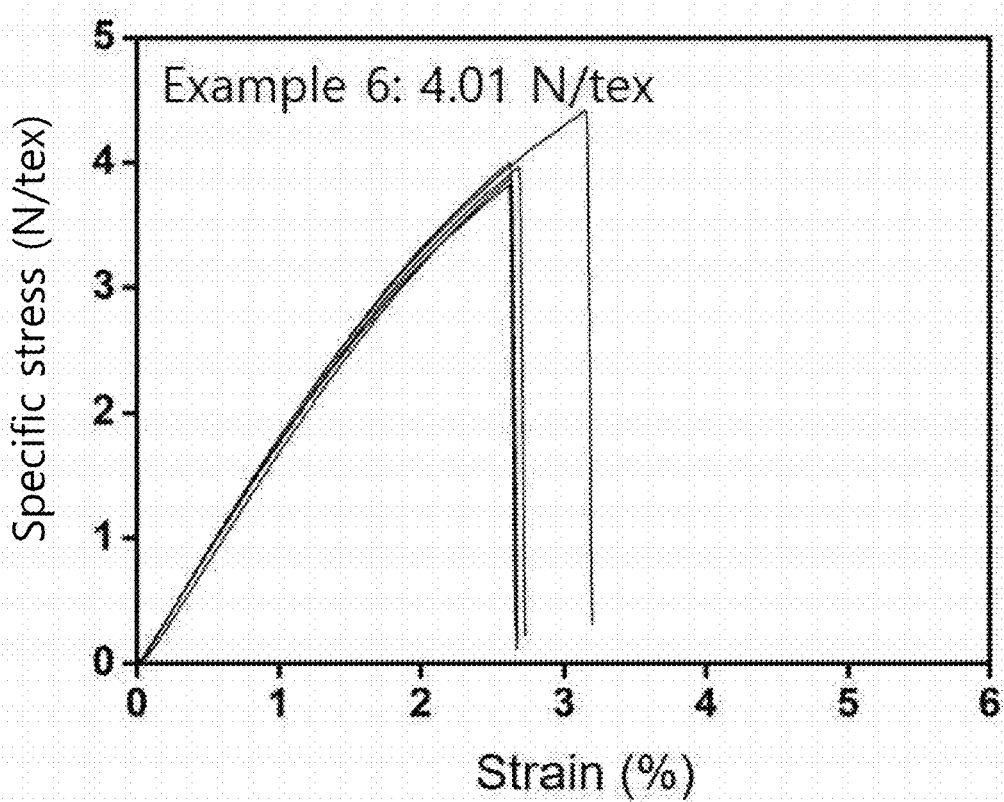
Figure 3I:
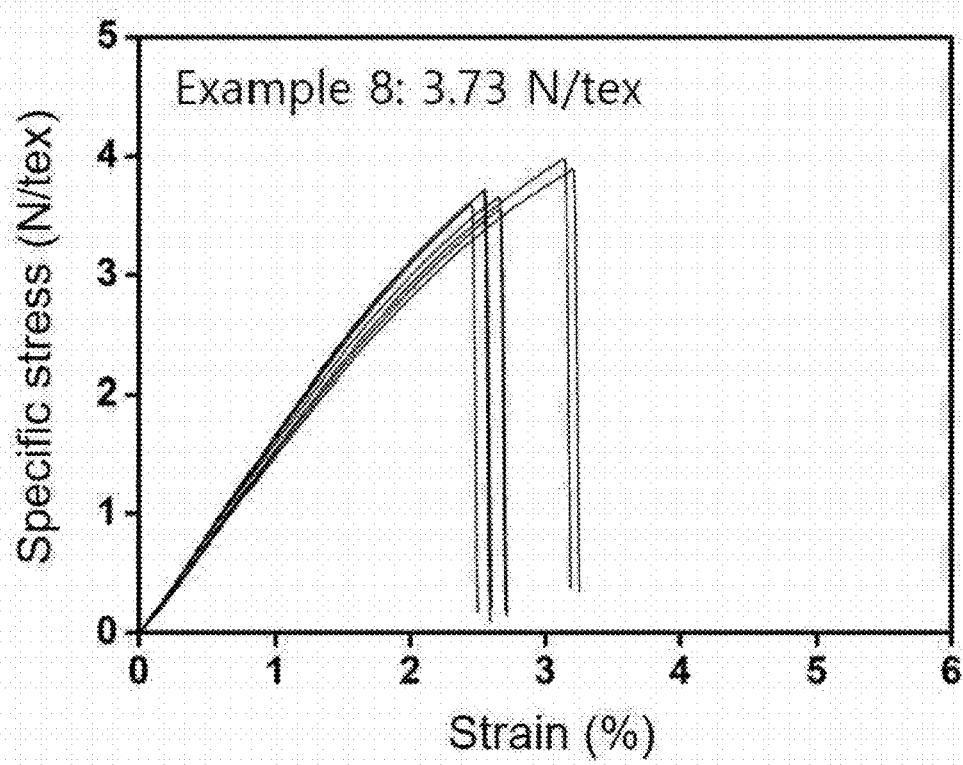
Figure 3J:
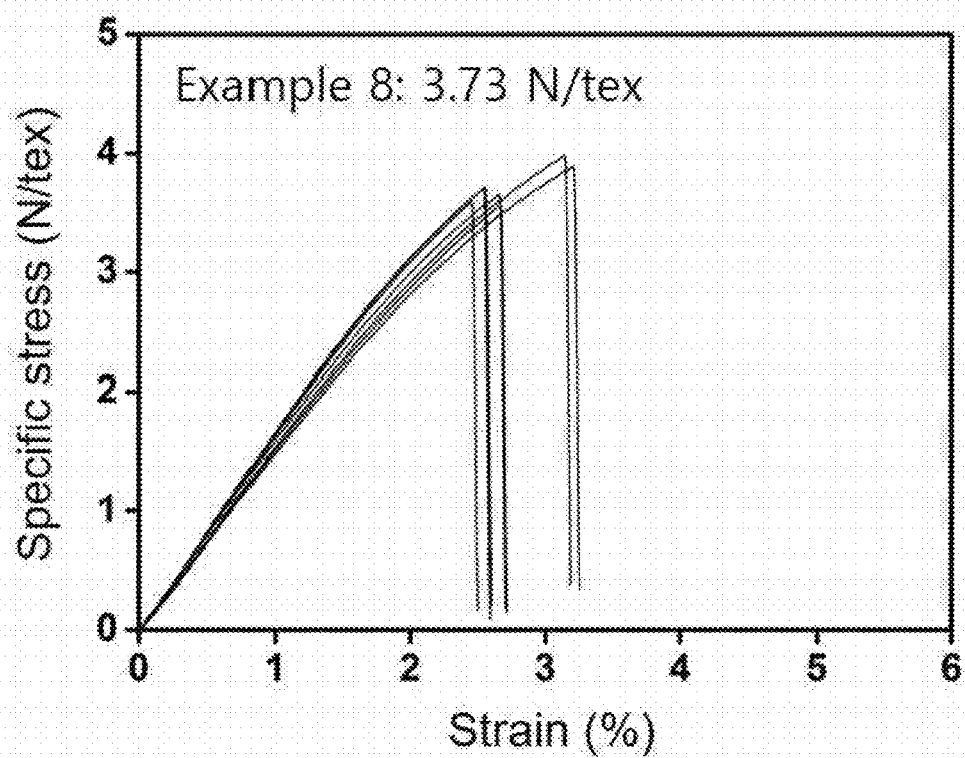
Figure 3K:
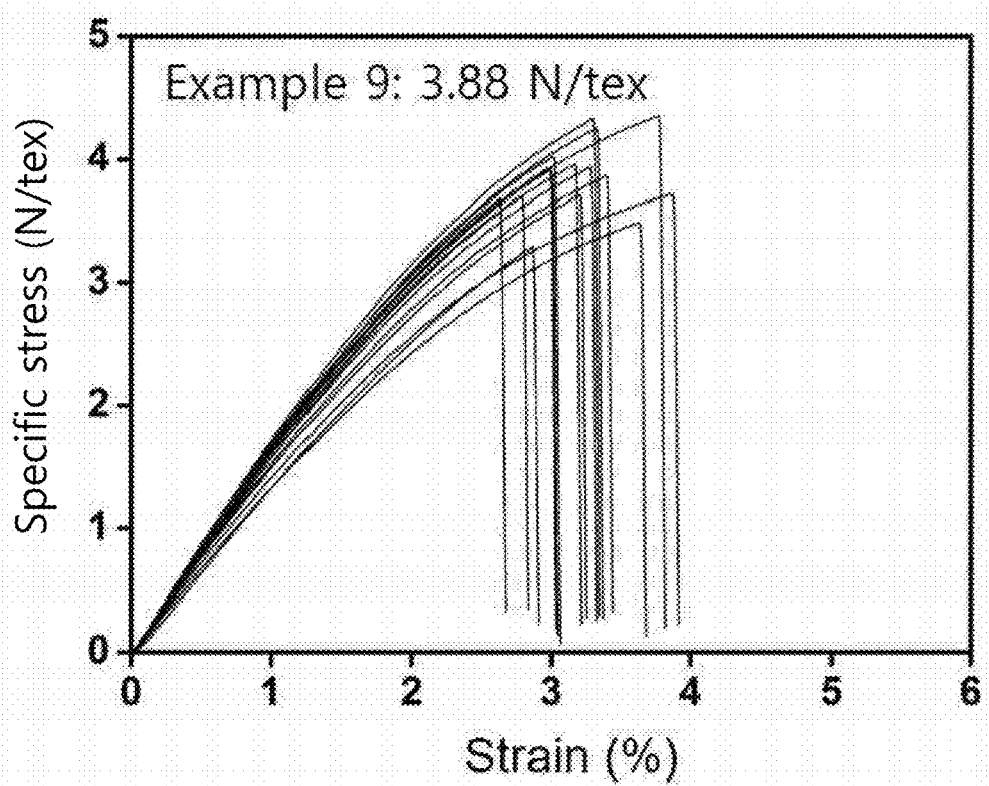

FIG. 1 shows a flow chart of a method for manufacturing carbon nanotube fibers according to an embodiment of the present invention; and FIG. 2 shows a schematic view of an apparatus for manufacturing carbon nanotube fibers according to an embodiment of the present invention.

First, carbon nanotube fibers are spun through gas phase direct aerosol spinning (S10). This step may be performed using a reactor 10 and the reactor 10 may include a heater.

In this process, for example, a solution consisting of acetone, ferrocene, thiophene, etc. by an appropriate combination is injected into the reactor 10 heated to a temperature of 1,000° C. or higher and form carbon nanotube aerogel and then drawn in the form of a fiber at a constant rate from the reactor.

The $I_G/I_D$ of carbon nanotubes may be 5 or higher, 7 or higher, 10 or higher, or 15 or higher, and in particular, the $I_G/I_D$ may be 10 or higher. When the $I_G/I_D$ is 10 or higher, the effects of treatment with a strong acid and tension become greater. The upper limit of the $I_G/I_D$ may be 500, 1000, or 10,000, but the $I_G/I_D$ is not limited thereto.

Then, the spun carbon nanotube fibers are oxidized (S20). The oxidation may be performed by heat treatment and/or by using plasma.

The heat treatment may be performed at a temperature of 200° C. to 400° C. and may be performed within the furnace 20. The plasma treatment may be performed at atmospheric pressure, but the plasma treatment is not limited thereto. In another embodiment, ozone treatment may be performed.

The heat treatment may be performed for 1 minute to 2 hours, but heat treatment time is not limited thereto. The plasma treatment may be performed at a power of 100 W to 500 W for 10 seconds to 10 minutes, but the plasma treatment time is not limited thereto.

Oxidation increases the oxygen ratio in the carbon nanotube fibers. When the $I_G/I_D$ of the carbon nanotubes is 10 or greater, the oxygen atom % of the carbon nanotube fibers may be in the range of 2 atom % to 20 atom %. When the oxygen atom % is 2 atom % or lower, the effects by the treatments with a strong acid and a tension become negligible, whereas when the oxygen atom % is 20 atom % or higher, the penetration by a strong acid becomes excessive thereby deteriorating the alignment.

After oxidation, the carbon nanotube fibers are subjected to treatments with a strong acid and a tension.

For the strong acid, any one selected from sulfuric acid, fuming sulfuric acid, chlorosulfonic acid, fluorosulfonic acid ($FSO_3H$), trifluoroacetic acid ($CF_3COOH$), trifluoromethanesulfonic acid ($CF_3SO_3H$), fluoroantimonic acid ($HSbF_6$), and carborane acid, and in particular, chlorosulfonic acid may be used.

This process may be performed by immersing the carbon nanotubes in chlorosulfonic acid to pass through, and an appropriate level of tension is applied to the carbon nanotube fibers. In this step, a chlorosulfonic acid bath 30 may be used.

The tension may be at a level in which the carbon nanotube fibers can be stretched by 4% to 20%, 4% to 15%, 4% to 12%, 6% to 10%, 8% to 10%, or 8% to 12%. When the tension is applied so that the carbon nanotube fibers can be stretched by less than 4%, the effect of improving orientation becomes negligible, whereas when the tension is applied so that the carbon nanotube fibers can be stretched by 15% or greater, the carbon nanotubes may be damaged.

When the carbon nanotube fibers pass through chlorosulfonic acid, there occurs a swelling. When fibers are under a tension in a swollen state, the carbon nanotubes may be realigned toward the axial direction of the fibers. Accordingly, the orientation of the carbon nanotubes toward the axial direction is improved.

A step of coagulation is performed after the treatments with a strong acid and a tension (S40).

Coagulation may be performed while allowing a solvent to pass through, and acetone may be used as a solvent. In this step, an acetone bath 40 may be used.

Then, as the carbon nanotube fibers pass through an acetone bath, they become coagulated and densification occurs. As the carbon nanotube fibers pass through the acetone bath several times, carbon nanotube fibers become densified and chlorosulfonic acid is removed during this process.

A step of washing and drying is performed after the coagulation (S50). For washing, a water bath 50 may be used, and drying may be performed in a vacuum dryer. The temperature of the vacuum dryer may be in a range of 150° C. to 200° C.

Then, heat treatment is performed (S60).

The heat treatment is performed in a furnace under an argon and/or hydrogen atmosphere and may be performed at a temperature of 250° C. to 800° C. for 10 minutes to 3 hours. During this process, chlorosulfonic acid and/or acetone are additionally removed.

The carbon nanotube fibers being manufactured may have a specific strength of 2 N/tex or greater, 3 N/tex or greater, or 4 N/tex. The upper limit of the specific strength may be 10 N/tex, 12 N/tex, or 15 N/tex, but the upper limit of the specific strength is not limited thereto. The carbon nanotube fibers being manufactured may have an electrical conductivity of 2 MS/m or greater or 3 MS/m or greater. The upper limit of electrical conductivity may be 10 MS/m, 50 MS/m, or 100 MS/m, but the upper limit of electrical conductivity is not limited thereto.

Additionally, the carbon nanotube fibers being manufactured may have a density of 1.0 g/cm$^3$ or greater, and may be 1.1 g/cm$^3$ to 1.8 g/cm$^3$, or 1.2 g/cm$^3$ to 1.8 g/cm$^3$, but the density of the carbon nanotube fibers is not limited thereto.

EXPERIMENTAL EXAMPLE

Hereinafter, the present invention will be described through Experimental Examples. In Experimental Examples, carbon nanotube fibers were manufactured and analyzed according to Comparative Example 1, Comparative Example 2, and Examples 1 to 8.

Comparative Example 1

Carbon nanotube fibers were manufactured by direct spinning of gas phase aerogel. The temperature of the vertical electric furnace (Lenton 1500° C. Tube Furnace, Quartz tube, diameter 7 cm, length 1 m) was increased to 1,170° C. while flowing argon at a rate of 1,000 sccm thereto. After the vertical electric furnace reached 1,170° C., which was the temperature for synthesis, hydrogen was flowed at a rate of 1,000 sccm for 10 minutes and the inside of the reactor was replaced with a hydrogen atmosphere. Then, a mixed solution of a carbon source (a precursor), a catalyst, and an activator (a solution in which acetone (97.8 wt %), ferrocene (1.6 wt %), and thiophene (0.8 wt %) were mixed) were injected into the inside of the reactor at a constant rate (0.2 mL/min). Carbon nanotubes were synthesized in large quantities and came down to the bottom of the reactor in the form of aerosols. The synthesized carbon nanotube aerogel was shrunk in the form of a fiber while allowing water to pass through, winding at a constant rate (10 m/min) thereby manufacturing carbon nanotube fibers having an IG/ID of 5.

Comparative Example 2

The carbon nanotube fibers, which were spun by direct spinning of gas phase aerogel in the same manner as described in Comparative Example 1, having an $I_G/I_D$ ratio of 5 were heated to 300° C. in an air atmosphere and maintained thereat for 30 minutes. Then, the carbon nanotube fibers were immersed into chlorosulfonic acid for 60 seconds to cause swelling and no tension was applied thereto. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 1

The carbon nanotube fibers, which were spun by direct spinning of gas phase aerogel in the same manner as described in Comparative Example 1, having an $I_G/I_D$ ratio of 5 were immersed in chlorosulfonic acid for 20 seconds to cause a swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 2

The carbon nanotube fibers, which were spun by direct spinning of gas phase aerogel in the same manner as described in Comparative Example 1, having an $I_G/I_D$ ratio of 17 were immersed in chlorosulfonic acid for 20 seconds to cause a swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 3

The carbon nanotube fibers, which were spun by direct spinning of gas phase aerogel in the same manner as described in Comparative Example 1, having an $I_G/I_D$ ratio of 5 were heated to 300° C. in an air atmosphere and maintained thereat for 30 minutes. Then, the carbon nanotube fibers were immersed in chlorosulfonic acid for 20 seconds to cause swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 4

The carbon nanotube fibers, which were spun by direct spinning of gas phase aerogel in the same manner as described in Comparative Example 1, having an $I_G/I_D$ ratio of 5 were subjected to atmospheric plasma treatment at a power of 250 W for 5 minutes while flowing argon at a rate of 10 slm and oxygen at a rate of 20 sccm thereto in an air atmosphere. Then, the carbon nanotube fibers were immersed in chlorosulfonic acid for 20 seconds to cause swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 5

The carbon nanotube fibers, which were spun by direct spinning of gas phase aerogel in the same manner as described in Comparative Example 1, having an $I_G/I_D$ ratio of 5 were heated to 300° C. in an air atmosphere and maintained thereat for 30 minutes. Then, the carbon nanotube fibers were immersed in chlorosulfonic acid for 20 seconds to cause swelling, and in particular, a tension was slowly applied thereto for 20 seconds to stretch carbon nanotube fibers by 6% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 6

The carbon nanotube fibers, which were spun by direct spinning of gas phase aerogel in the same manner as described in Comparative Example 1, having an $I_G/I_D$ ratio of 17 were heated to 300° C. in an air atmosphere and maintained thereat for 5 minutes. Then, the carbon nanotube fibers were immersed in chlorosulfonic acid for 20 seconds to cause swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 7

The carbon nanotube fibers, which were spun by direct spinning of gas phase aerogel in the same manner as described in Comparative Example 1, having an $I_G/I_D$ ratio of 17 were heated to 300° C. in an air atmosphere and maintained thereat for 30 minutes. Then, the carbon nanotube fibers were immersed in chlorosulfonic acid for 20 seconds to cause swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 8

The carbon nanotube fibers, which were spun by direct spinning of gas phase aerogel in the same manner as described in Comparative Example 1, having an $I_G/I_D$ ratio of 17 were subjected to atmospheric plasma treatment at a power of 250 W for 30 seconds while flowing argon at a rate of 10 slm and oxygen at a rate of 20 sccm thereto in an air atmosphere. Then, the carbon nanotube fibers were immersed in chlorosulfonic acid for 20 seconds to cause swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

Example 9

The carbon nanotube fibers, which were spun by direct spinning of gas phase aerogel in the same manner as described in Comparative Example 1, having an $I_G/I_D$ ratio of 12 were immersed in chlorosulfonic acid for 20 seconds to cause swelling, and in particular, a tension was slowly applied thereto for 40 seconds to stretch the carbon nanotube fibers by 10% compared to their original length. The carbon nanotube fibers were washed twice in an acetone bath and once in a water bath, dried overnight in a vacuum over at 170° C., and subjected to heat treatment in a furnace at 600° C. under argon and hydrogen atmosphere for 1 hour.

<Analysis Result 1>

The mechanical strength of carbon nanotube fibers was measured using FAVIMAT (Textechno) equipment. The length of the gauge to be measured was 20 mm and the strain rate was 2.0 mm/min. FIG. 3A to FIG. 3K shows the specific stress-strain curve of carbon nanotube fibers.

Comparing Comparative Example 1 with Comparative Example 2, it was confirmed that when a tension was not applied, the effect of the CSA treatment was insignificant.

Comparing Comparative Example 2 with Example 3, the improvement of specific strength was apparent when a tension was applied in a state where carbon nanotube fibers were immersed in a strong acid.

Comparing among Examples 1, 2, and 9, it was confirmed that the effects of treatments with a strong acid and a tension were significant when the $I_G/I_D$ was high.

Comparing Example 1 with Example 3, it was confirmed that the effects of treatments with a strong acid and a tension became greater when carbon nanotube fibers were oxidized through heat treatment when the $I_G/I_D$ was low ($I_G/I_D=5$).

Comparing Example 3 with Example 4, it was confirmed that the effects of treatments with a strong acid and a tension were similar between a case where carbon nanotube fibers were oxidized through heat treatment and a case where carbon nanotube fibers were oxidized through atmospheric oxygen plasma, when the $I_G/I_D$ was low ($I_G/I_D=5$).

Comparing Example 3 with Example 5, it was confirmed that specific strength further improved as the tension became greater.

Comparing Example 2 with Example 7, it was confirmed that when $I_G/I_D$ was high ($I_G/I_D=17$), the effects of treatments with a strong acid and a tension were reduced when carbon nanotube fibers were oxidized through heat treatment for 30 minutes compared to when carbon nanotube fibers were not oxidized. However, when carbon nanotube fibers were oxidized for 5 minutes (Example 6), the effects of treatments with a strong acid and a tension were similar to when carbon nanotube fibers were not oxidized (Example 2). This is because when the $I_G/I_D$ is high, the penetration of a strong acid proceeds too rapidly thereby deteriorating the alignment. Accordingly, there is an appropriate level of oxidation according to the $I_G/I_D$ values, that is, when the $I_G/I_D$ is low it is necessary to increase the wettability through oxidation, whereas when the $I_G/I_D$ is high it is necessary to limit the degree of oxidation.

Comparing Example 7 with Example 8, it was confirmed that the effects of treatments with a strong acid and a tension were shown to be similar between a case where carbon nanotube fibers were treated with atmospheric oxygen plasma for a short period of time (30 seconds) and a case where carbon nanotube fibers were treated with heat for 30 minutes. It is suggested that this is because oxygen plasma strongly oxidizes carbon nanotubes within a short period of time. When the $I_G/I_D$ is high, the treatment with excessive oxidation causes a disadvantageous result with respect to the treatments with a strong acid and a tension, and thus it is preferred that the heat treatment be performed within a short period of time as in Example 6.

<Analysis Result 2>

Figure 4:
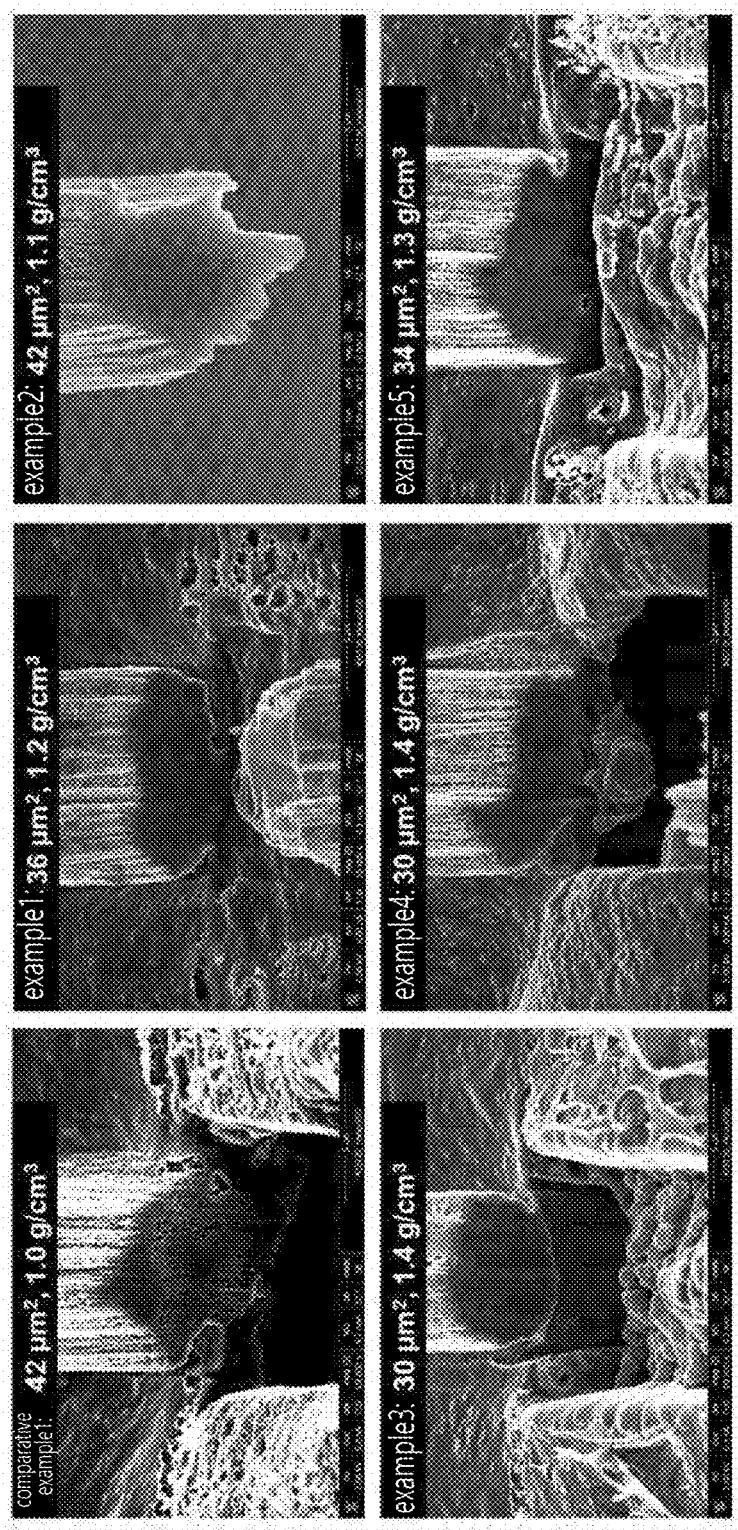
FIG. 4 shows the images of a scanning electron microscope of carbon nanotube fibers manufactured in Experimental Example.

The cross-sections of carbon nanotubes were observed by scanning electron microscope (FEI). For the observation of the cross-sections, the fibers were cut using a focused ion beam (FIB). FIG. 4 shows the images of the cross-sections of carbon nanotubes observed by scanning electron microscope.

It was confirmed that the shape of fibers in Comparative Example 1 was observed to be irregular, whereas the shape of fibers in Examples were observed to be uniform.

Densities were increased when treated with a strong acid and a tension. In Comparative Example 1, the density was 1.0 g/cm$^3$ and all of the densities in Examples treated with a strong acid and a tension were 1 or greater.

The densities in cases where the treatments with a strong acid and a tension were performed following the oxidation treatment (Examples 3, 4, and 5) were higher compared to when only the treatments with a strong acid and a tension were performed without oxidation treatment (Examples 1 and 2). This is because chlorosulfonic acid can better penetrate into the inside of the fibers as the carbon nanotubes are oxidized.

<Analysis Result 3>

Figure 5:
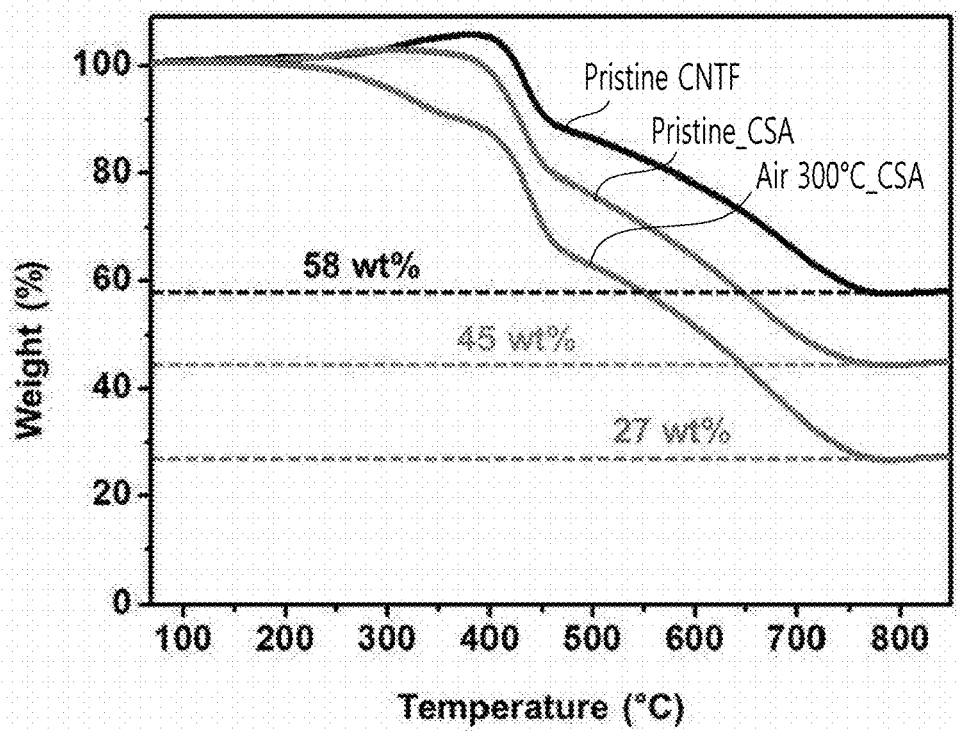
FIG. 5 shows the thermogravimetric analysis (TGA) graph of carbon nanotube fibers manufactured in Experimental Example.

Thermogravimetric analysis (TGA) was performed for the carbon nanotube fibers according to Comparative Example 1 (Pristine CNTF), Example 1 (Pristine_CSA CNTF), and Example 3 (Pristine_Air CSA CNTF). The equipment used for the analysis was Q50 (TA instruments, U.S.A.). The results are shown in FIG. 5.

When the oxidation was performed in the air through heat treatment, the impurities of the iron catalyst after CSA treatment was significantly reduced from 58 wt % to 27 wt %.

When treated with CSA without heat treatment, the impurities of the iron catalyst were reduced slightly.

Accordingly, it was confirmed that it is preferred to include the oxidation process from the aspect of purification.

<Analysis Result 4>

Figure 6:
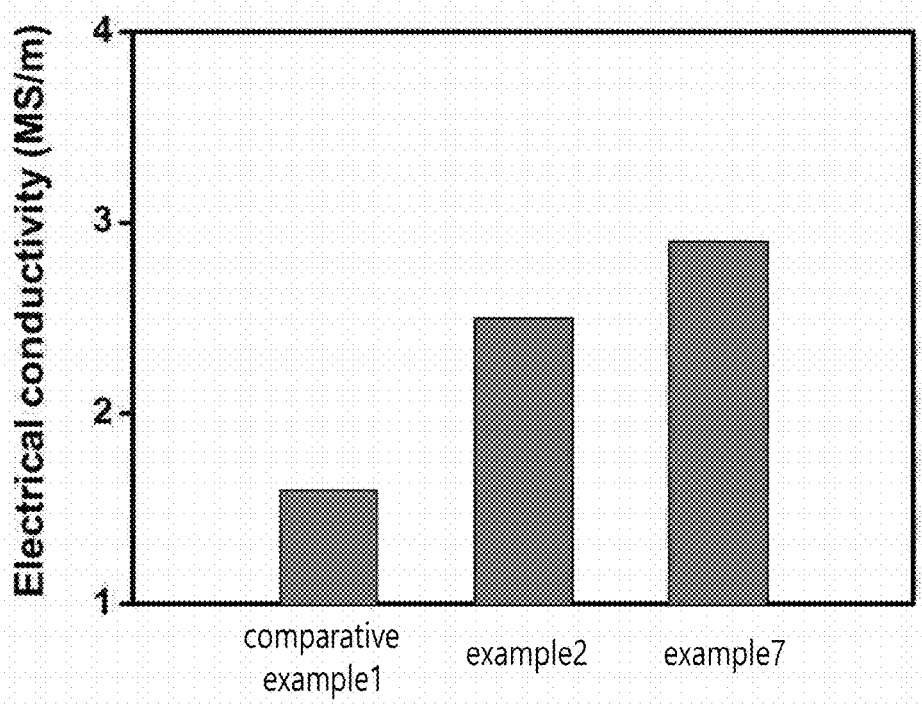
FIG. 6 shows the electrical conductivity of carbon nanotube fibers manufactured in Experimental Example.

Electrical conductivity was measured for the carbon nanotube fibers according to Comparative Example 1, Example 2, and Example 7. The measurement was performed using the 4-point probe method with the probe station (MST-4000A, MS Tech, Korea). The cross-section area was calculated from the images by cross-sectional scanning microscope. The results are shown in FIG. 6.

Comparing among Comparative Example 1, Example 2, and Example 7, electrical conductivity was improved after the treatments with a strong acid and a tension.

Comparing Example 2 with Example 7, the electrical conductivity was more significantly improved when treated with a strong acid and a tension after oxidation.

<Analysis Result 5>

Figure 7:
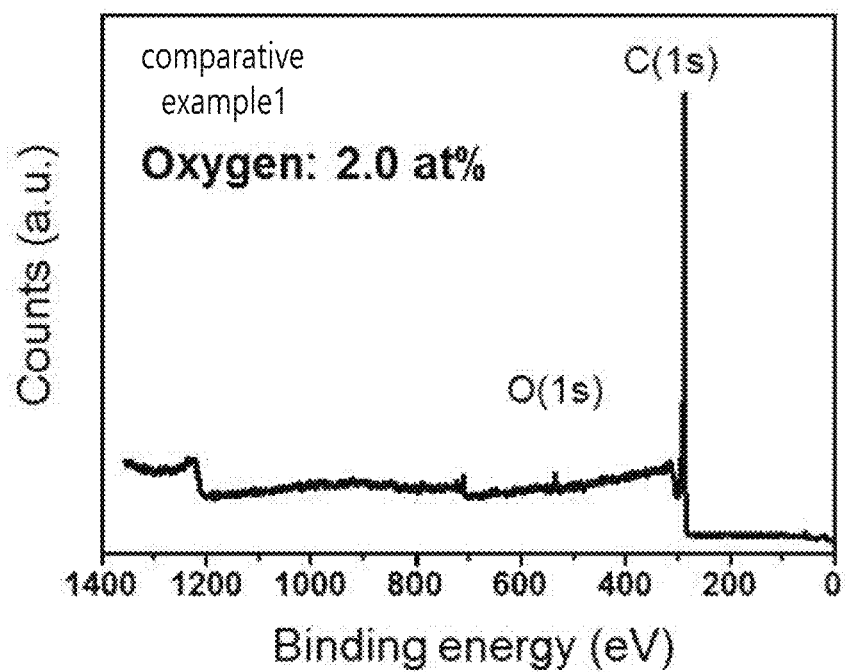
FIG. 7 shows the results of XPS analysis of carbon nanotube fibers manufactured in Experimental Example.
Figure 7:
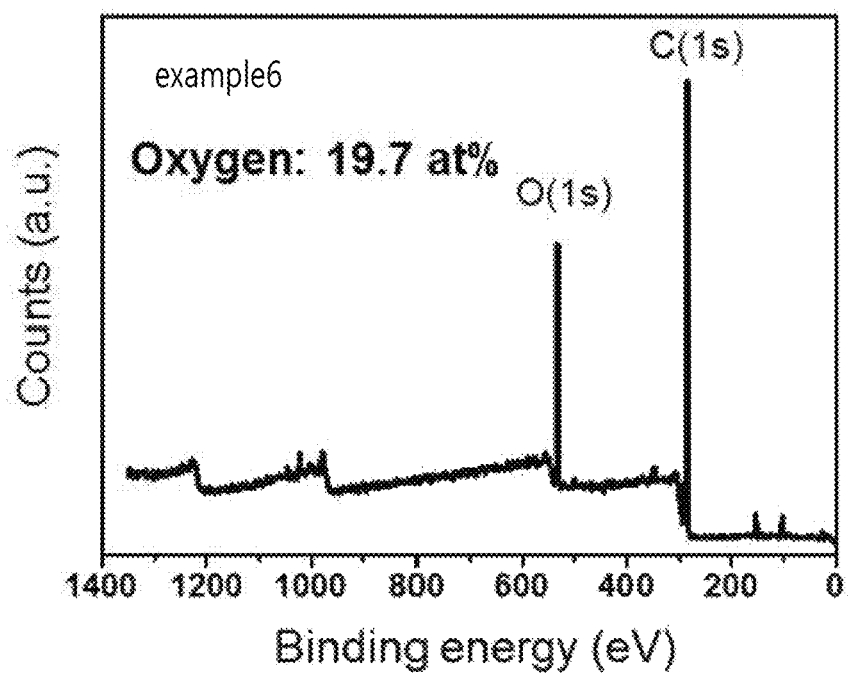

The chemical state of the surfaces of carbon nanotube fibers was analyzed by XPS. FIG. 7 shows the XPS survey spectra of the carbon nanotube fibers according to Comparative Example 1 and Example 6, and the atom % of oxygen was calculated based on the same.

The atom % of oxygen was increased when oxidized with heat treatment in the air (Example 6) compared to Comparative Example 1.

Advantage Effects of the Present Invention

According to the present invention, a method for continuous manufacture of carbon nanotube fiber (CNTF) with high strength and high conductivity is provided.

What is claimed is:

1. A method for continuously manufacturing carbon nanotube fibers with high strength and high conductivity, comprising:
    synthesizing carbon nanotube fibers by direct spinning;
    treating the carbon nanotube fibers with a strong acid while applying tension thereto; and
    washing the carbon nanotube fibers thereafter,
    wherein the carbon nanotube fibers have an $I_G/I_D$ ratio of 10 or greater and the tension is applied so as to stretch the carbon nanotube fibers by 4% to 15%.

2. The method of claim 1, wherein the carbon nanotube fibers after the washing have a density of 1.1 g/cm$^3$ or greater, a specific strength of 2 N/tex or greater, and an electrical conductivity of 2 MS/m or greater.

3. The method of claim 1, wherein the tension is applied so as to stretch the carbon nanotube fibers by 8% to 15%.

4. The method of claim 3, further comprising oxidizing the carbon nanotube fibers before treating with the strong acid.

5. The method of claim 4, wherein the oxidation is performed so that the oxygen atom % of the carbon nanotube fibers is in the range of 2% to 20%.

6. The method of claim 1, further comprising coagulating the carbon nanotube fibers after the treatment with the strong acid.

7. The method of claim 1, wherein the strong acid is at least one selected from the group consisting of sulfuric acid, chlorosulfonic acid, fuming sulfuric acid, fluorosulfonic acid (FSO$_3$H), trifluoroacetic acid (CF$_3$COOH), trifluoromethanesulfonic acid (CF$_3$SO$_3$H), fluoroantimonic acid (HSbF$_6$), and carborane acid.

* * * * *